US010334500B2

(12) United States Patent
Wu et al.

(10) Patent No.: US 10,334,500 B2
(45) Date of Patent: Jun. 25, 2019

(54) WIRELESS COMMUNICATION APPARATUS AND METHOD FOR SELECTING ONE OR MORE RELAY COMMUNICATION DEVICES BASED ON HISTORICAL AND CURRENT ENERGY INFORMATION

(71) Applicant: SONY CORPORATION, Tokyo (JP)

(72) Inventors: Guilu Wu, Nanjing (CN); Pingping Xu, Nanjing (CN)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 15/533,073

(22) PCT Filed: Nov. 26, 2015

(86) PCT No.: PCT/CN2015/095618
§ 371 (c)(1),
(2) Date: Jun. 5, 2017

(87) PCT Pub. No.: WO2016/091077
PCT Pub. Date: Jun. 16, 2016

(65) Prior Publication Data
US 2017/0367027 A1  Dec. 21, 2017

(30) Foreign Application Priority Data

Dec. 12, 2014 (CN) .......................... 2014 1 0767412

(51) Int. Cl.
*H04W 40/22* (2009.01)
*H04W 40/10* (2009.01)
(Continued)

(52) U.S. Cl.
CPC ............. *H04W 40/10* (2013.01); *H04L 45/42* (2013.01); *H04W 40/22* (2013.01);
(Continued)

(58) Field of Classification Search
CPC . H04W 40/10; H04W 52/0203; H04W 40/22; H04W 40/02; H04W 40/04;
(Continued)

(56) References Cited

U.S. PATENT DOCUMENTS 7,593,376 B2 * 9/2009 D'Amico ............ H04W 72/005
370/338
7,853,208 B2 * 12/2010 Washiro ............... H04B 5/0012
340/572.7
(Continued)

FOREIGN PATENT DOCUMENTS

CN        102238685 A     11/2011
WO   WO 2014/109797 A1   7/2014

OTHER PUBLICATIONS

International Search Report dated Jan. 29, 2016 in PCT/CN2015/095618.

*Primary Examiner* — Devan A Sandiford
(74) *Attorney, Agent, or Firm* — Xsensus LLP

(57) ABSTRACT

An apparatus and method for wireless communication. The apparatus includes processing circuitry: configured to receive a relay establishment request from a source communication device; configured to acquire historical energy information and current energy information about a candidate communication device as a relay candidate, and to determine one or more relay communication devices to be used as a relay based on the acquired information; and configured to send information about the relay establishment to the one or more relay communication devices, the source communication device, and a destination communication device.

22 Claims, 6 Drawing Sheets

(51) Int. Cl.
*H04L 12/717* (2013.01)
*H04W 52/02* (2009.01)

(52) U.S. Cl.
CPC ......... *H04W 52/0203* (2013.01); *Y02D 70/00* (2018.01); *Y02D 70/1262* (2018.01); *Y02D 70/20* (2018.01); *Y02D 70/21* (2018.01); *Y02D 70/326* (2018.01); *Y02D 70/39* (2018.01)

(58) Field of Classification Search
CPC ..... H04W 40/18; H04W 40/08; H04W 40/12; H04W 40/125; H04W 40/14; H04W 40/16; H04W 40/20; Y02D 70/30; Y02D 70/32; Y02D 70/38; Y02D 70/39; Y02D 70/324; Y02D 70/326; Y02D 70/34
USPC .................................................. 455/9, 11.1, 7
See application file for complete search history.

(56) References Cited

U.S. PATENT DOCUMENTS

| | | | |
|---|---|---|---|
| 8,243,641 B2 | 8/2012 | Kim | |
| 2004/0233847 A1* | 11/2004 | Park | H04L 45/00 370/235 |
| 2008/0188177 A1* | 8/2008 | Tan | H04B 7/2606 455/11.1 |
| 2008/0266081 A1* | 10/2008 | D'Agostino | G08B 25/10 340/539.21 |
| 2009/0003261 A1* | 1/2009 | Kim | H04B 7/2606 370/315 |
| 2009/0147728 A1* | 6/2009 | Atia | H04B 7/0617 370/321 |
| 2010/0027418 A1* | 2/2010 | Rodrig | H04L 41/147 370/235 |
| 2010/0136988 A1* | 6/2010 | Dewasurendra | H04B 7/2606 455/450 |
| 2012/0089885 A1* | 4/2012 | Grube | H03M 13/05 714/752 |
| 2013/0016652 A1* | 1/2013 | Ke | H04W 40/10 370/315 |
| 2014/0094208 A1* | 4/2014 | Egner | H04W 72/085 455/513 |
| 2014/0119272 A1* | 5/2014 | Wong | H04W 40/04 370/315 |
| 2014/0198637 A1 | 7/2014 | Shan et al. | |
| 2015/0036597 A1 | 2/2015 | Chou et al. | |
| 2015/0038136 A1* | 2/2015 | Wu | H04W 88/04 455/434 |
| 2015/0133132 A1* | 5/2015 | Li | H04L 1/0002 455/450 |
| 2015/0201342 A1 | 7/2015 | Vannithamby | |
| 2015/0201352 A1 | 7/2015 | Shan et al. | |
| 2015/0215028 A1* | 7/2015 | Ljung | H04W 88/04 370/315 |
| 2015/0230114 A1* | 8/2015 | Delsol | H04W 36/0094 370/252 |
| 2015/0312788 A1* | 10/2015 | Delsol | H04W 24/10 370/252 |
| 2016/0183271 A1* | 6/2016 | Zhou | H04B 17/309 370/315 |
| 2016/0212682 A1* | 7/2016 | Chung | H04W 76/14 |
| 2017/0027009 A1* | 1/2017 | Dumpala | H04B 7/15507 |
| 2017/0126417 A1* | 5/2017 | Wu | H04L 12/189 |
| 2017/0223753 A1* | 8/2017 | Hoglund | H04W 76/10 |
| 2017/0245254 A1* | 8/2017 | Kitagawa | H04W 72/042 |
| 2017/0325243 A1* | 11/2017 | Yasukawa | H04W 72/085 |
| 2017/0347338 A1* | 11/2017 | Chen | H04W 8/005 |

* cited by examiner

WIRELESS COMMUNICATION APPARATUS AND METHOD FOR SELECTING ONE OR MORE RELAY COMMUNICATION DEVICES BASED ON HISTORICAL AND CURRENT ENERGY INFORMATION

FIELD OF THE INVENTION

The embodiments of the present disclosure generally relates to the technical field of wireless communications, particularly to a collaborative communication technology, and more particularly to a wireless communication apparatus and a wireless communication method for selecting a relay communication device based on historical energy information and current energy information of candidate communication devices.

BACKGROUND OF THE INVENTION

With the rapid development of the communication industry, a future network presents higher technical challenges to the communication technology, and resource conservation and efficiency enhancement become subjects of future network development. Green communication emerges on this back ground. The conventional wireless network has disadvantages such as high channel fading, high system power consumption, and poor received signal quality, due to limitations of the external environment where the wireless network locates and hardware conditions of its own devices. However, in a collaborative communication technology, a wireless terminal can be fully utilized to establish multiple communication links between the transmission end and the reception end, and fading in wireless channels can be overcome using space diversity in the conventional multi-antenna technology, thereby improving the performance and robustness of the wireless network system. In the collaborative communication, how to perform relay selection and power allocation is an important factor that affects the performance of the system.

With the collaborative communication technology, power consumptions and energy consumptions of the network system can be effectively reduced without affecting the quality of services provided to the users, thus the network energy utilization efficiency can be enhanced. Further, cellular spectrum reuse can be enhanced by using the D2D technology, improving spectrum efficiency, and increasing a network system capacity.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an apparatus for wireless communications is provided, which includes: a receiving unit, configured to receive a relay establishment request from a source communication device; a determining unit, configured to acquire historical energy information and current energy information of candidate communication devices serving as relay candidates, and determine, based on the acquired information, one or more relay communication devices to be used as relays; and a transmitting unit, configured to transmit information on relay establishment to the one or more relay communication devices, the source communication device and a destination communication device.

According to another aspect of the present disclosure, a method for wireless communications is further provided, which includes: receiving a relay establishment request from a source communication device; acquiring historical energy information and current energy information of candidate communication devices serving as relay candidates, and determining, based on the acquired information, one or more relay communication devices to be used as relays; and transmitting information on relay establishment to the one or more relay communication devices, the source communication device and a destination communication device.

According to another aspect of the present disclosure, an apparatus in a wireless communication system is provided, which includes: a receiving unit, configured to receive an energy information collection request from a control node; a detecting unit, configured to detect, in response to the energy information collection request, a current energy information value of an electronic device where the apparatus is located; and a transmitting unit, configured to transmit the detected current energy information value to the control node.

According to another aspect of the present disclosure, a method applied in a wireless communication system is provided, which includes: receiving an energy information collection request from a control node; detecting, in response to the energy information collection request, a current energy information value of an electronic device implementing the method; and transmitting the detected current energy information value to the control node.

According to other aspects of the present disclosure, computer program codes and a computer program product for implementing the method for wireless communications described above, and a computer-readable storage medium on which the computer program codes for implementing the method for wireless communications described above are recorded are further provided.

According to the apparatus for wireless communications and the method for wireless communications of the present disclosure, relay communication devices are selected based on the historical energy information and the current energy information of candidate communication devices, thus communication links can be dynamically selected with the variation of the network, thereby effectively enhancing the network communication efficiency and extending the lifecycle of the network.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

<A First Embodiment>

Figure 1:
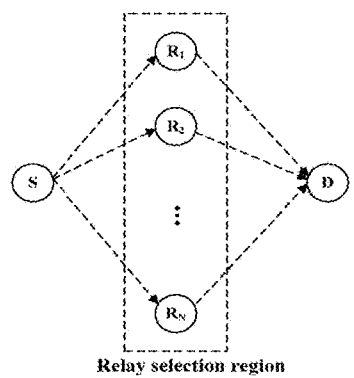
FIG. 1 is a schematic diagram illustrating a model of collaborative network communications.

As described above, in the collaborative communications, multiple communication links may be established between a source communication device and a destination communication device to achieve space diversity. FIG. 1 illustrate a schematic diagram of a model of the collaborative network communications, where S represents the source communication device, D represents the destination communication device, and the dotted line block in the middle represents a relay selection region, which includes, for example, multiple candidate communication devices $R_1$ to $R_N$ which can be used as relay communication devices. The collaborative communication network described herein can be of various types, which include but are not limited to an AF (amplify-and-forward) collaborative communication network, a DF (decode-and-forward) collaborative communication network, and the like.

Currently, a random relay selection algorithm is generally adopted. That is, one or more communication devices are randomly selected from among idle candidate communication devices and used as relay communication devices, thereby implementing forwarding of source signals. This algorithm is easy to implement and has a low complexity, but is susceptible to wireless channel fading, interferences and external environment noises due to its randomness and failure to consider channel qualities of a channel from a source node to a relay node and a channel from the relay node to a destination node. Therefore, it is difficult to ensure the communication quality. However, in the present disclosure, the relay communication device is selected from the relay selection region with the method described in the following.

Figure 2:
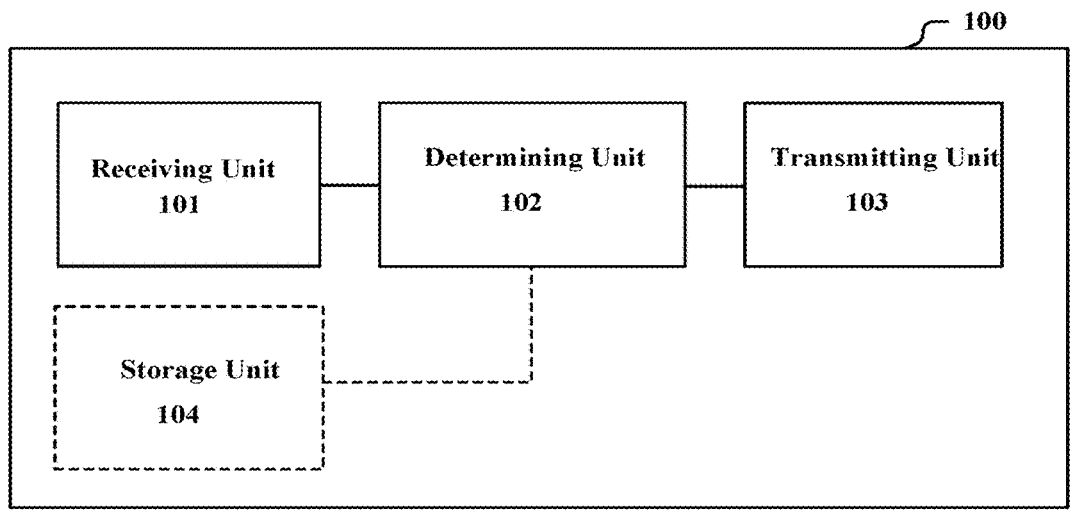
FIG. 2 is a structural diagram illustrating an apparatus for wireless communications according to an embodiment of the present disclosure.

FIG. 2 illustrates a structural diagram of an apparatus 100 for wireless communications according to an embodiment of the present disclosure. The apparatus 100 includes: a receiving unit 101, configured to receive a relay establishment request from a source communication device; a determining unit 102, configured to acquire historical energy information and current energy information of candidate communication devices serving as relay candidates, and determine, based on the acquired information, one or more relay communication devices to be used as relays; and a transmitting unit 103, configured to transmit information on relay establishment to the one or more relay communication devices, the source communication device and a destination communication device.

The apparatus 100 can be located, for example, in a control node of the communication network. For example, in the LTE scenario, the apparatus 100 can be located in an enhanced Node B (eNB), but is not limited thereto. The apparatus 100 may also exist as a separate device. Further, the scenario to which the apparatus 100 can be applied is not limited to the above collaborative communication network, but can be any communication environment in which a relay communication device needs to be selected.

The model in FIG. 1 is still taken as an example. The source communication device S needs to communicate with the destination communication device D. However, there is no direct transmission link between the source communication device S and the destination communication device D. The source communication device S transmits a relay establishment request to the apparatus 100. The receiving unit 101 of the apparatus 100 receives the request. The determining unit 102 takes, for example, the idle communication devices in the relay selection region as the candidate communication devices, acquires the historical energy information and the current energy information of these relay candidates, and determines, based on these information, which one or which ones of the candidate communication devices are to be selected as the relay communication devices for implementing the communication between the source communication device S and the destination communication device D. After the relay communication devices are selected, the transmitting unit 103 transmits information on relay establishment to the selected relay communication devices, the source communication device S and the destination communication device D, where the information is used for, for example, indicating an identification of a communication process to be performed.

As an example, the transmitting unit 103 is configured to transmit an energy information collection request to the candidate communication devices in response to the relay establishment request, and the receiving unit 101 is configured to receive energy information collection responses from the candidate communication devices.

The energy information collection responses may include the historical energy information and the current energy information of respective candidate communication devices. That is, both the historical energy information and the current energy information are provided by the candidate communication devices.

Alternatively, the energy information collection responses may include the current energy information of respective candidate communication devices. Referring back to FIG. 2, as shown by the dotted line block in FIG. 2, the apparatus 100 may further include a storage unit 104 configured to store the acquired current energy information in association with a time instant at which the current energy information is acquired as well as an identifier of the candidate communication device corresponding to the acquired current energy information, where the determining unit 102 is configured to acquire the historical energy information of the candidate communication devices from the storage unit 104. With such a configuration, the amount of information to be exchanged between the candidate communication devices and the apparatus 100 can be further reduced, thereby improving the network efficiency.

In an example, the determining unit 102 is configured to predicate, based on the historical energy information and the current energy information, energy values of respective candidate communication devices at a next time point using a time sequence predication model, and determine the first N candidate communication devices with maximum energy values as the relay communication devices, where N≥1.

The time sequence predication model is one of an auto-regressive (AR) model, an auto-regressive moving average (ARMA) model, a moving average (MA) model, and a non-parametric auto-regressive moving average (NARMA) model, for example.

For ease of understanding, a specific example of the determining unit 102 is provided below by taking the ARMA model as an example. However, it should be understood that the implementation of the determining unit 102 is not limited thereto.

Assuming a set of the candidate communication devices is $\Re$, for all candidate communication devices $R_i \in \Re$, $i \in \{1, 2, \ldots, N\}$, the determining unit 102 acquires the historical energy information values and the energy information values at a current time instant t of respective candidate communication devices, introduces them into the ARMA model to acquire predictive energy values of respective candidate communication devices at a time instant t+1, sorts the candidate communication devices in a descending order of the predictive energy values, and determines the first N candidate communication devices as the relay communication devices. For example, in the case of N being 1, the above process may be described by the following equation (1):

$$R_S = \underset{R_i \in R, i \in \{1,2,\ldots,N\}}{\operatorname{argmax}} E_{R_i} \quad (1)$$

where $E_{R_i}$ the predictive energy value of the candidate communication device $R_i$, and $R_s$ is the selected relay communication device.

As can be seen, by selecting the relay communication devices based on the historical energy information and the current energy information of the candidate communication devices, the relay communication devices may be appropriately selected, thereby enhancing the network efficiency and extending the lifecycle of the network as much as possible.

In addition, in another example, the receiving unit 101 is further configured to receive a relay request from the source communication device, the determining unit 102 is further configured to determine emission power of the source communication device and the relay communication devices, such that total energy consumption is minimum while satisfying a QoS condition, and the transmitting unit 103 is configured to transmit information on the determined emission power to the source communication device and the relay communication devices respectively.

Specifically, upon reception of the information on relay establishment from the transmitting unit 103, the source communication device determines that the relay communication can be started, and thus transmits the relay request to the receiving unit 101 of the apparatus 100 to initiate communication.

The determining unit 102 optimizes the emission power of the source communication device and the relay communication devices, in order to reduce the total energy consumption as much as possible while satisfying the QoS condition. The transmitting unit 103 transmits information on the optimized emission power to the source communication device and the relay communication devices respectively, such that the source communication device and the relay communication devices perform communication in accordance with respective emission power.

In addition, the transmitting unit 103 may be further configured to transmit resource allocation information, such as a frequency band and a time slot to be used, to the source communication device and the relay communication devices.

In a following, a specific implementation of the determining unit 102 optimizing the emission power is described, by taking the AF collaborative communication network as an example, where a single relay communication device is selected. However, it should be understood that, the communication network to which the apparatus 100 can be applied is not limited to the AF collaborative communication network, and the number of the selected relay communication devices is not limited to one.

The set of the candidate communication devices $\Re$ mentioned above is still used. Assuming that x and x' are emission signals of the source communication device and the relay communication device $R_i$ ($R_i \in \Re$, $i \in \{1, 2, \ldots, N\}$) selected by the determining unit 102 respectively, of which the power is normalized, $E[|x|^2]=E[|x'|^2]=1$; $P_s$ and $P_i$ are emission power of the source communication and the relay communication device $R_i$ respectively; $h_{si}$ and $h_{id}$ are channel fading coefficients of a channel between the source communication device and the relay communication device $R_i$ and a channel between the relay communication device $R_i$ and the destination communication device respectively, and they are circularly symmetric complex Gaussian random variables which are independent with each other, of which mean values are 0 and variances are $\sigma_{si}^2$ and $\sigma_{id}^2$ respectively; $n_{si}$ and $n_{id}$ are independent, zero-mean additive white Gaussian noise of respective channels, the variance of each of which $\sigma^2$, signals received by the relay communication device $R_i$ and received by the destination communication device through the relay communication devices $R_i$ are respectively expressed by the following equations (2) and (3):

$$y_{si} = \sqrt{P_s} h_{si} x + n_{si};  \quad (2), \text{ and}$$

$$y_d = \sqrt{P_i} h_{id} x' + n_{id} \quad (3)$$

In the case that the AF protocol is adopted, an amplification gain of the signal received at the relay communication devices $R_i$ is:

$$G = 1 / \sqrt{P_s |h_{si}|^2 + \sigma_{si}^2}, \text{ and} \quad (4)$$

$$x' = G y_{si} \quad (5)$$

At this time, the signal received by the destination communication device which is expressed by equation (3) becomes:

$$y_d = \sqrt{P_i} \, h_{id} x' + n_{id} \quad (6)$$

$$= \sqrt{\frac{P_s P_i}{P_s |h_{si}|^2 + \sigma_{si}^2}} h_{si} h_{id} x + \sqrt{\frac{P_i}{P_s |h_{si}|^2 + \sigma_{si}^2}} h_{id} n_{si} + n_{id}.$$

A signal-to-noise ratio of the signal received by the destination communication device is:

$$\gamma = \frac{\gamma_{si} \gamma_{id}}{\gamma_{si} + \gamma_{id} + 1}, \quad (7)$$

where $\gamma_{si} = P_s |h_{si}|^2 / \sigma^2$ and $\gamma_{id} = P_i |h_{id}|^2 / \sigma^2$. For the sake of simplicity, it may be assumed that the variance of the channel $\sigma^2 = 1$.

Then, the following optimization problem is established according to downlink (or uplink and downlink) channel status information:

$$\min_{R_i \in R} P = P_s + P_i \quad (8)$$
$$\text{s.t. } \gamma \geq \lambda,$$

where P is total power of the relay link, $\lambda$ is a minimum signal-to-noise ratio which satisfies the QoS condition, and other symbols respectively have meanings defined in the above.

Combining the equation (7) and the equation (8), in order to solve the convex optimization problem expressed by equation (8), the determining unit 102 may determine the emission power using a Lagrange multiplier method. For example, optimal power of the source communication device and the relay communication device satisfying the equation (8) may be obtained, which are respectively expressed by the following equation (9) and equation (10):

$$P_s = \frac{\sqrt{\lambda(\lambda+1)} \, |h_{si}| + \lambda |h_{id}|}{|h_{id}||h_{si}|^2}, \text{ and} \quad (9)$$

$$P_i = \frac{\lambda |h_{si}| + \sqrt{\lambda(\lambda+1)} \, |h_{id}|}{|h_{id}|^2 |h_{si}|}. \quad (10)$$

At this time, the minimum total power consumption of the links under the condition of the optimal relay is:

$$P = \frac{\left(\sqrt{\lambda} \, |h_{si}| + \sqrt{\lambda+1} \, |h_{id}|\right)^2 - |h_{id}|^2}{|h_{si}|^2 |h_{id}|^2}. \quad (11)$$

In other words, the determining unit 102 can acquire the minimum total energy consumption, by performing power allocation for the source communication device and the determined relay communication device in accordance with equation (9) and equation (10).

It should be understood that, in the above, the determination of the emission power is optimized using the Lagrange multiplier method, however, the present disclosure is not limited thereto, and other optimization method, such as an artificial intelligence optimization method and an infinite approximation optimization method, can also be adopted.

As an application example, the above apparatus 100 may be applied in, for example, a D2D relay network. In the D2D relay network, generally, direct transmission is advantageous. However, in a certain communication range, a direct link may have a greater path fading as compared with a delay link due to the affect from the environment. Under the same communication rate and system performance, the emission power and the energy consumption can be reduced by using the D2D relay.

Figure 3:
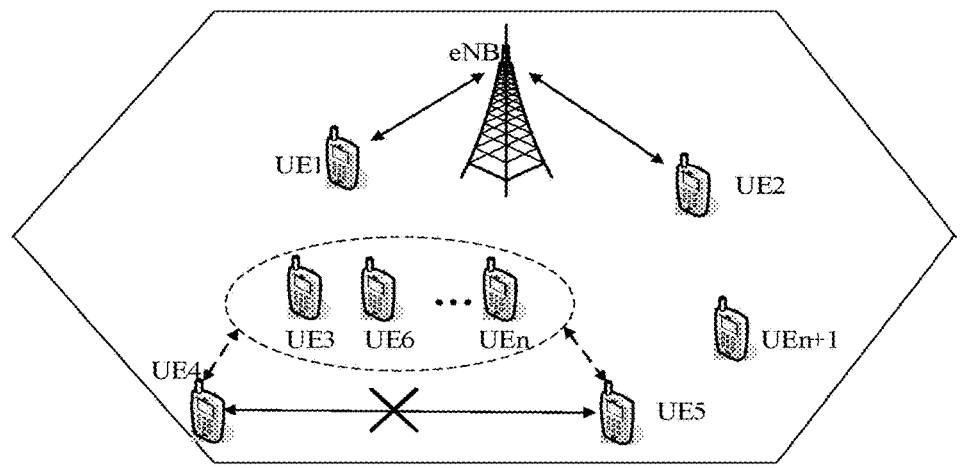
FIG. 3 is a schematic diagram illustrating a D2D relay communication network.

FIG. 3 illustrates a schematic diagram of a D2D relay communication network, which includes an enhanced Node B (eNB) and multiple user equipments (UEs), where the apparatus 100 according to the present disclosure may be located in the eNB. As an example, UE1 and UE2 operate in a cellular mode, UEn+1 operates in an idle mode, UE4 and UE5 operate in a D2D mode, and other UEs (the eNB may also be included) are used as candidate communication devices. Solid lines represent operating communication links, dotted lines represent optional communication links, and "x" on the connection line indicates that the link is disconnected.

When the direct link between UE4 and UE5 is disconnected, UE4 performs the relay selection process to search for a suitable relay so as to ensure normal process of the communications. If there is no suitable UE to implement the relay communication, UE4 may transmit a relay establishment request to the apparatus 100 provided in the base station eNB. Of course, UE4 may also directly transmit the relay establishment request to the apparatus 100 when the direct link is disconnected.

Figure 4:
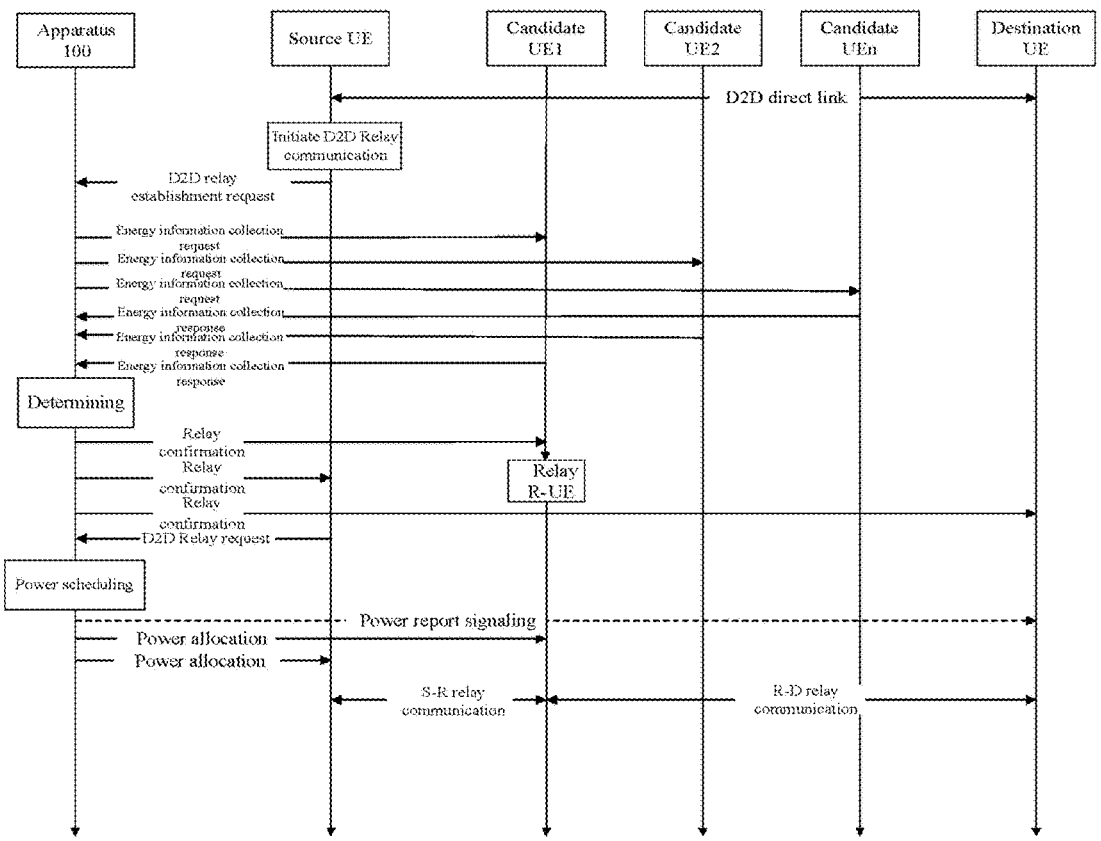
FIG. 4 is a procedure chart illustrating a signaling interaction flow for D2D relay network communications according to an embodiment of the present disclosure.

FIG. 4 illustrate a signaling interaction procedure between the UE and the eNB. As can be seen, this signaling interaction procedure is similar to the signaling interaction embodied in the above description of the apparatus 100, except that the application scenario is limited in the D2D relay communications. Initially, the source UE and the destination UE communicates with each other with a D2D direct link. When the link transmission fails, the source UE initiates the D2D relay mode. That is, the source UE transmits a D2D relay establishment request frame to the apparatus 100. As described above, the transmitting unit 103 of the apparatus 100 transmits an energy information collection request to all of the candidate UEs in response to the request frame. Upon reception of the energy information collection request, the candidate UEs transmit energy information collection response frames to the apparatus 100, to report at least the current energy information of the candidates UEs to the apparatus 100. Subsequently, the determining unit of the apparatus 100 selects, based on the historical energy information and the current energy information, UEs to be used as relay communication devices using, for example, the ARMA model. The transmitting unit 103 transmits the information on relay establishment, i.e., a relay confirmation frame to the source UE, the selected relay UEs and the destination UE respectively. The information on relay establishment (the relay confirmation frame) may include, for example, a D2D identifier.

Next, upon reception of the relay confirmation frame, the source UE transmits a D2D relay request frame to the apparatus 100 at the beginning of data communication. The determining unit 102 determines the emission power of the source UE and the relay UE using the power allocation method for the source communication device and the relay communication devices. The transmitting unit 103 can transmit a power allocation command frame to the source UE and the relay UEs using a control signaling. In addition, the transmitting unit 103 may also transmit resource allocation information to the source UE and the relay UEs using a control signaling. As an example, the transmitting unit 103 may also transmit a power report signaling to the destination UE, in order to notify the destination UE of the power (and resource) allocation information. After that, the D2D relay communication is started.

In summary, the apparatus 100 according to the present disclosure is capable of selecting the optimal relay set by selecting relay communication devices based on the historical energy information and the current energy information of candidate communication devices, thereby effectively enhancing the network efficiency and extending the lifecycle of the network. In addition, it is also possible to optimize the power allocation between the source communication device and the relay communication devices, thereby reducing the network energy consumption and further extending the lifecycle of the network.

<A Second Embodiment>

Figure 5:
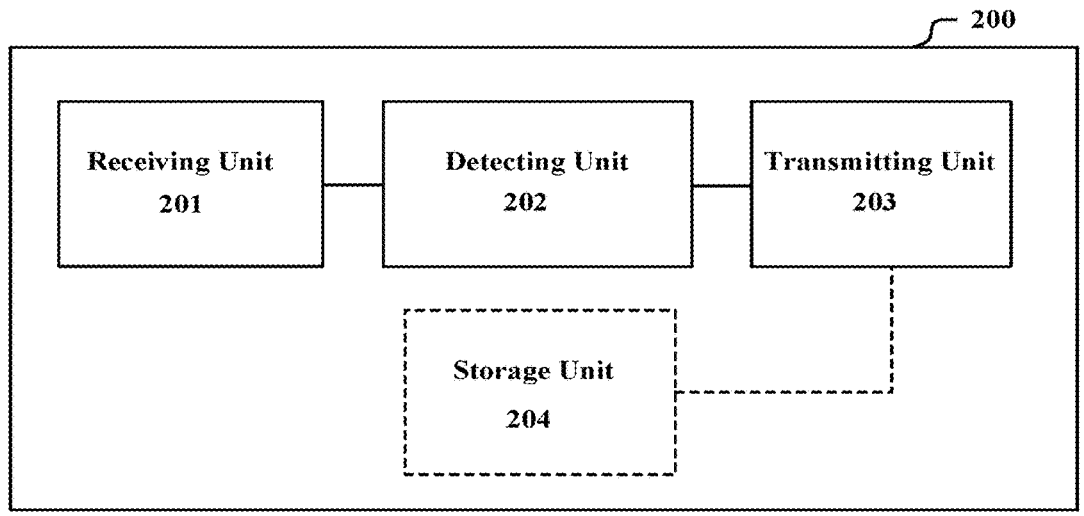
FIG. 5 is a structural diagram illustrating an apparatus for wireless communications according to another embodiment of the present disclosure.

FIG. 5 illustrates a structural diagram of an apparatus 200 for wireless communications according to another embodiment of the present disclosure. The apparatus 200 includes: a receiving unit 201, configured to receive an energy information collection request from a control node; a detecting unit 202, configured to detect, in response to the energy information collection request, a current energy information value of an electronic device where the apparatus 200 is located; and a transmitting unit 203, configured to transmit the detected current energy information value to the control node.

In an example, the transmitting unit 203 is further configured to transmit a relay establishment request or a relay request to the control node. For example, in the case that the electronic device provided where the apparatus 200 is located needs to perform relay communication, the transmitting unit 203 may transmit the relay establishment request; while in the case that the control node selects a relay link and notifies the electronic device of the selected relay link, the transmitting unit 203 may transmit the relay request to request to initiate the relay communication.

In addition, the receiving unit 201 may be configured to receive information on relay establishment from the control node. For example, in the case that the electronic device itself serves as the source communication device, serves as the relay communication device selected by the control node, or serves as the destination communication device, the receiving unit 201 receives the information.

Referring back to FIG. 5, as shown by the dotted line block in FIG. 5, in another example, the apparatus 200 may further include a storage unit 204 configured to store a historical energy information value of the electronic device, where the transmitting unit 203 is further configured to transmit the historical energy information value to the control node. In this case, the apparatus 200 may provide the control node with both the current energy information and the historical energy information.

For example, the apparatus 200 may be implemented as a mobile terminal (such as a smart phone, a tablet personnel computer (PC), a notebook PC, a portable game terminal, a portable/dongle mobile router and a digital camera device) or an in-vehicle terminal (such as a car navigation device). The apparatus 200 may also be implemented as a terminal for performing a machine-to-machine (M2M) communication (also referred as a machine-type communication (MTC) terminal). In addition, the apparatus 200 may be a wireless communication module (for example an integrated circuit module including a single wafer) mounted on each of the terminals described above.

As described above, the apparatus 200 according to this embodiment is capable of providing the control node with the energy information value of the electronic device corresponding to the apparatus 200 in response to the energy information collection request.

<A Third Embodiment>

Figure 6:
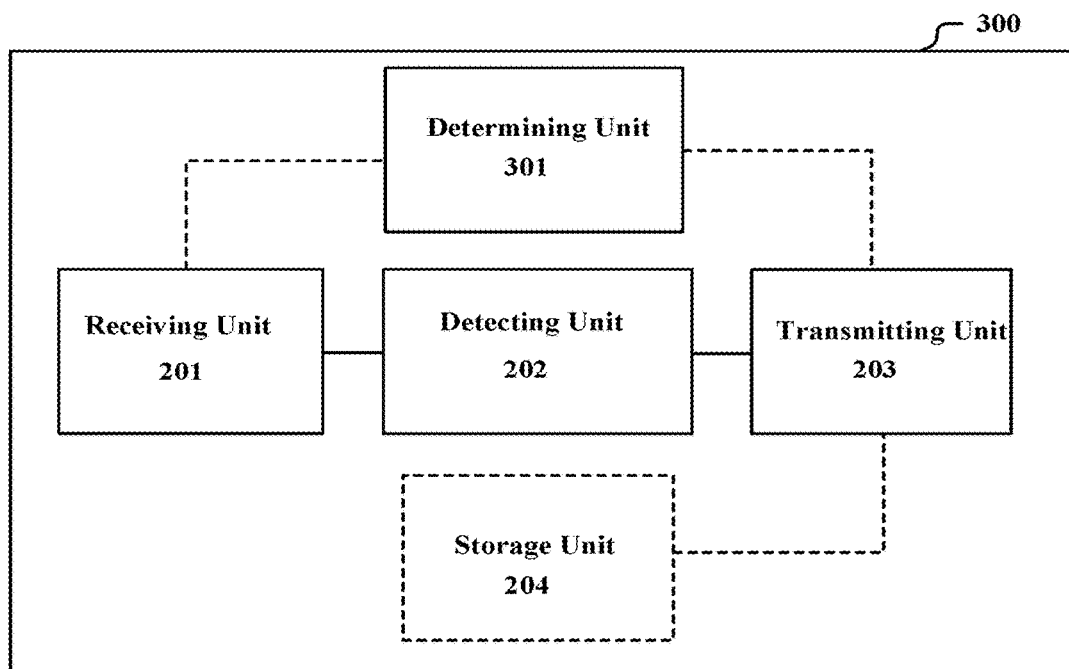
FIG. 6 is a structural diagram illustrating an apparatus for wireless communications according to yet another embodiment of the present disclosure.

FIG. 6 illustrates a structural diagram of an apparatus 300 for wireless communications according to another embodiment of the present disclosure. As compared with FIG. 5, the apparatus 300 further includes: a determining unit 301, configured to acquire historical energy information and current energy information of candidate communication devices serving as relay candidates in the case that the electronic device serves as a source communication device, and determine, based on the acquired information, one or more relay communication devices to be used as the relays, where the transmitting unit 203 is further configured to transmit information on relay establishment to the one or more relay communication devices and a destination communication device.

The structure and function of the determining unit 301 is the same as that of the determining unit 102 described in the first embodiment. In other words, in this embodiment, the relay communication devices are selected at the side of the source communication device.

As an example, the transmitting unit 203 is further configured to transmit an energy information collection request to the candidate communication devices, and the receiving unit 201 is further configured to receive energy information collection responses from the candidate communication devices. The energy information collection responses may include the historical energy information and the current energy information of respective candidate communication devices.

The determining unit 301 may be configured to predicate, based on the historical energy information and the current energy information, energy values of respective candidate communication devices at a next time point using a time sequence predication model, and determine the first N candidate communication devices with maximum energy values as the relay communication devices, where $N \geq 1$.

As described above, the time sequence predication model includes but is not limited to an auto-regressive (AR) model, an auto-regressive moving average (ARMA) model, a moving average (MA) model, a non-parametric auto-regressive moving average (NARMA) model, and the like.

In addition, the determining unit 301 may be further configured to determine emission power of the electronic device and the relay communication devices, such that total energy consumption is minimum while satisfying a QoS condition, and the transmitting unit 203 is further configured to transmit information on the determined emission power to the relay communication devices. For example, the determining unit 301 may determine the emission power using a Lagrange multiplier method. In an example, the transmitting unit 203 is further configured to transmit resource allocation information to the relay communication devices.

As described above, in the D2D relay communication scenario, the information on relay establishment may include a D2D identifier.

The detailed description of the above determining unit 301 may refer to the description of the determining unit 102 in the first embodiment, and is not repeatedly described herein.

<A Fourth Embodiment>

In the process of describing the apparatus for wireless communications in the embodiments described above, obviously, some processing and methods are also disclosed. Hereinafter, an overview of the methods is given without repeating some details disclosed above. However, it should be noted that, although the methods are disclosed in a process of describing the apparatus for wireless communications, the methods do not certainly employ or are not certainly executed by the aforementioned components. For example, the embodiments of the apparatus for wireless communications may be partially or completely implemented with hardware and/or firmware, the method for wireless communications described below may be executed by a computer-executable program completely, although the hardware and/or firmware of the apparatus for wireless communications can also be used in the methods.

Figure 7:
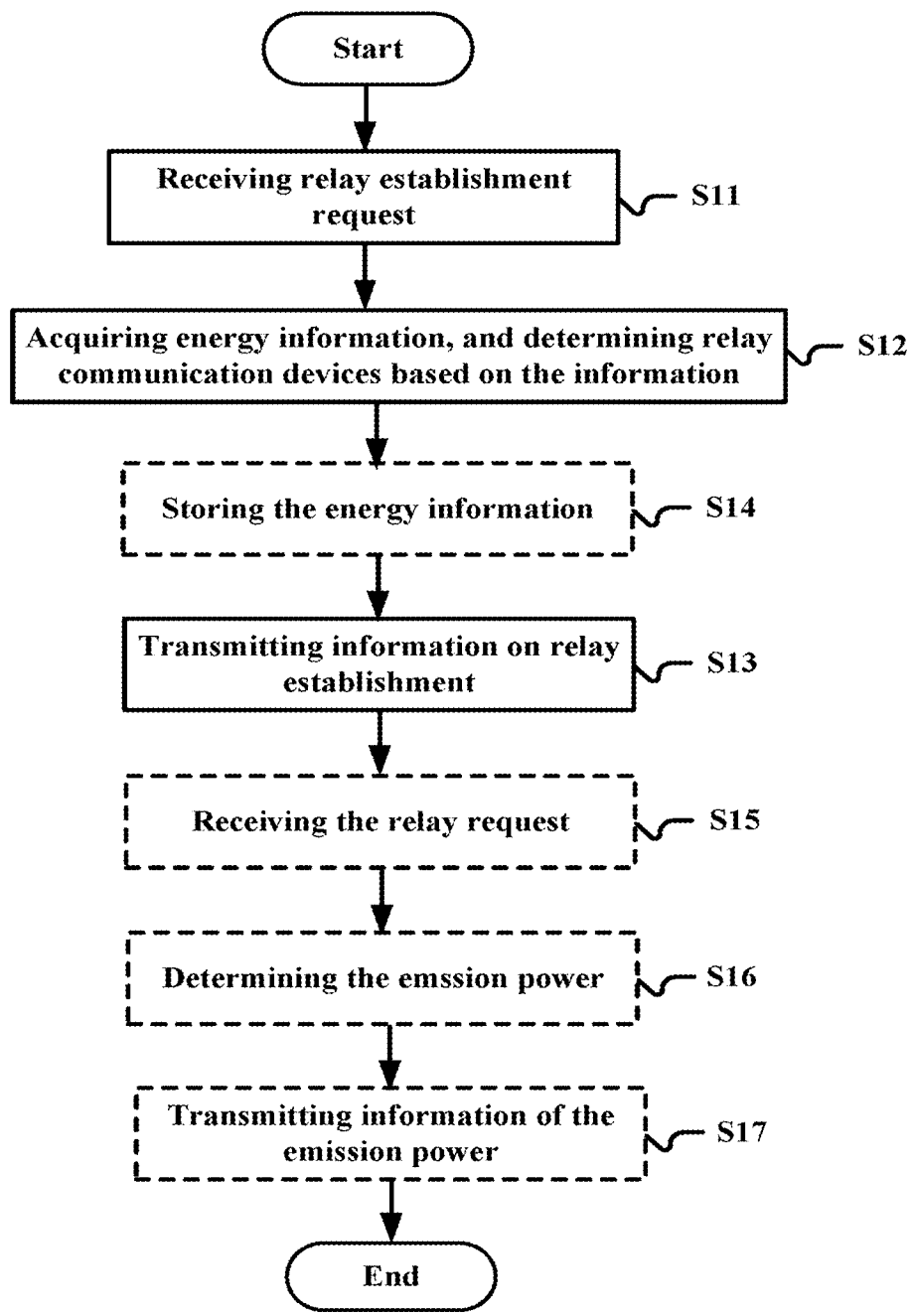
FIG. 7 is a flow chart illustrating a method for wireless communications according to an embodiment of the present disclosure.

FIG. 7 illustrates a flow chart of a method for wireless communications according to an embodiment of the present disclosure. The method includes the following steps: receiving a relay establishment request from a source communication device (S11); acquiring historical energy information and current energy information of candidate communication devices serving as relay candidates, and determining, based on the acquired information, one or more relay communication devices to be used as the relays (S12); and transmitting information on relay establishment to the one or more relay communication devices, the source communication device and a destination communication device (S13).

As an example, in step S12, an energy information collection request is transmitted to the candidate communication devices in response to the relay establishment request, and energy information collection responses from the candidate communication devices are received, where the energy information collection responses may include the historical energy information and the current energy information of respective candidate communication devices.

Alternatively, the energy information collection responses may include the current energy information of respective candidate communication devices. In this case, as shown by the dotted line block in FIG. 7, the above method may further include step S14: storing the acquired current energy information in association with a time instant at which the current energy information is acquired as well as an identifier of the candidate communication device corresponding to the acquired current energy information. In addition, in step S12, the relay communication devices are determined based on the acquired current energy information and the previously stored historical energy information of respective candidate communication devices.

As an example, in step S12, it is possible to predicate, based on the historical energy information and the current energy information, energy values of respective candidate communication devices at a next time point using a time sequence predication model, and determine the first N candidate communication devices with maximum energy values as the relay communication devices, where N≥1.

The time sequence predication model is one of an auto-regressive model, an auto-regressive moving average model, a moving average model, and a non-parametric auto-regressive moving average model, for example.

In the scenario of the D2D relay communication network, the information on relay establishment transmitted in step S13 may include, for example, a D2D identifier. Of course, the scenario to which the method can be applied is not limited thereto, and the configuration of the information is not limited thereto, either.

In this method, the relay communication devices are selected based on the historical energy information and the current energy information of candidate communication devices, thereby optimizing the relay link, enhancing the communication efficiency and extending the lifecycle of the network.

Referring back to FIG. 7, the above method may further include the following steps: receiving a relay request from the source communication device (S15), determining emission power of the source communication device and the relay communication devices, such that total energy consumption is minimum while satisfying a QoS condition (S16), and transmitting information on the determined emission power to the source communication device and the relay communication devices respectively (S17).

In addition, step S17 may further include transmitting resource allocation information to the source communication device and the relay communication devices.

In an example, in step S16, the emission power is determined using a Lagrange multiplier method.

In this method, power allocation among the source communication device and the relay communication devices is optimized, thereby effectively reducing energy consumption of the network while satisfying the QoS condition, and thus further extending the lifecycle of the network.

Figure 8:
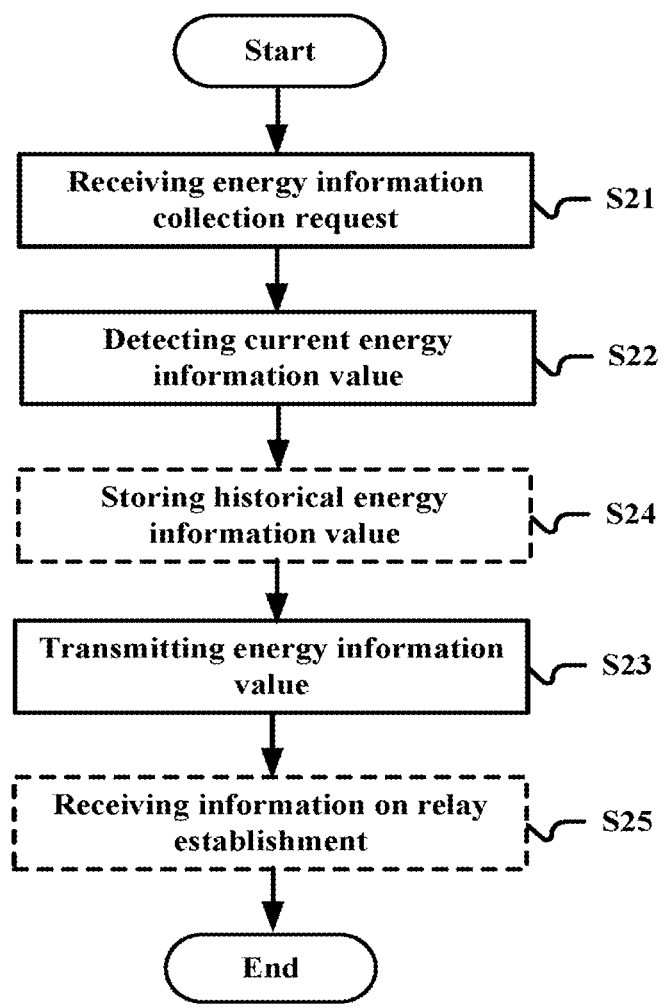
FIG. 8 is a flow chart illustrating a method for wireless communications according to another embodiment of the present disclosure.

FIG. 8 illustrates a flow chart of a method for wireless communications according to another embodiment of the present disclosure. The method includes the following steps: receiving an energy information collection request from a control node (S21); detecting a current energy information value of an electronic device implementing the method, in response to the energy information collection request (S22); and transmitting the detected current energy information value to the control node (S23).

In an example, the method may further include step S24 (as shown by the dotted line block in FIG. 8): storing a historical energy information value of the electronic device. In this case, step S23 further includes: transmitting the historical energy information value to the control node.

In addition, as shown by the dotted line block in FIG. 8, in the case that the control node selects the electronic device to serve as the relay communication device, the method further includes the following step S25: receiving information on relay establishment from the control node.

Although not shown in FIG. 8, in the case that the electronic device serves as the source communication device, the electronic device may perform a step of transmitting a relay establishment request to the control node, and perform a step of receiving information on relay establishment from the control and a step of transmitting a relay request to initiate relay communication when the control node selects a relay link.

As another example, in the above case where the electronic device serves as the source communication device, the relay communication devices may be selected by the electronic device rather than by the control node. That is, the electronic device performs the following steps: acquiring historical energy information and current energy information of candidate communication devices serving as relay candidates, determining, based on the acquired information, one or more relay communication devices to be used as the relays; and transmitting information on relay establishment to the one or more relay communication devices and a destination communication device.

Specifically, the required energy information may be acquired by transmitting an energy information collection request to the candidate communication devices, and receiving energy information collection responses from the candidate communication devices. The energy information collection responses may include the historical energy information and the current energy information of respective candidate communication devices.

In an example, energy values of respective candidate communication devices at a next time point may be predicted using a time sequence predication model, based on the historical energy information and the current energy information, and the first N candidate communication devices with maximum energy values are determined as the relay communication devices, where N≥1.

As described above, the time sequence predication model may include but is not limited to an auto-regressive model, an auto-regressive moving average model, a moving average model, a non-parametric auto-regressive moving average model, and the like.

In addition, the following steps may be further performed: determining emission power of the electronic device and the relay communication devices, such that total energy consumption is minimum while satisfying a QoS condition, and transmitting information on the determined emission power to the relay communication devices.

For example, the emission power may be determined using a Lagrange multiplier method. Further, resource allocation information may be transmitted to the relay communication devices.

In the D2D relay communication scenario, the information on relay establishment may include a D2D identifier.

It is to be noted that, the above methods can be performed separately or in combination with each other, and the detailed descriptions thereof are described in the first to the third embodiments and are not repeatedly described herein.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It should be understood by those skilled in the art that, the determining unit, the storage unit, the detecting unit and the like, for example, in the apparatus described above may be implemented by one or more processes, while the receiving unit, the transmitting unit and the like, for example, may be implemented by circuit components such as an antenna, a filter, a modem, a codec and the like.

Therefore, an electronic device (1) is further provided according to the present disclosure, which includes: a circuit configured to: receive a relay establishment request from a source communication device; acquire historical energy information and current energy information of candidate communication devices serving as relay candidates, and determine, based on the acquired information, one or more relay communication devices to be used as relays; and transmit information on relay establishment to the one or more relay communication devices, the source communication device and a destination communication device.

An electronic device (2) is further provided according to the present disclosure, which includes: a circuit configured to: receive an energy information collection request from a control node; detect, in response to the energy information collection request, a current energy information value of the electronic device; and transmit the detected current energy information value to the control node.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 900 shown in FIG. 9) from a storage medium or network, wherein the computer is capable of implementing various functions when installed with various programs.

Figure 9:
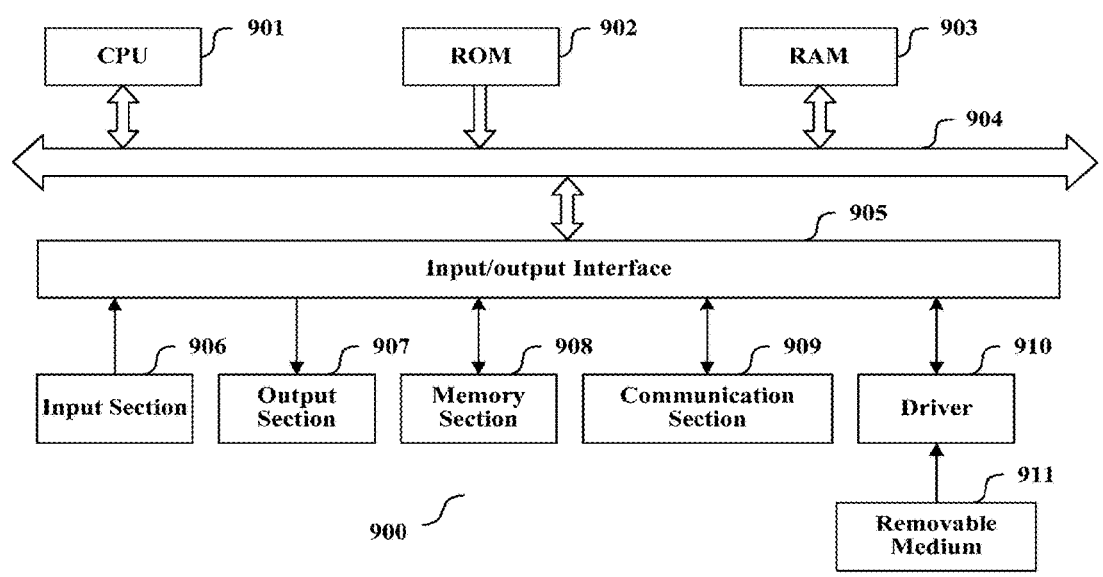
FIG. 9 is an exemplary block diagram illustrating the structure of a general purpose personal computer capable of realizing the method and/or device and/or system according to the embodiments of the present invention.

In FIG. 9, a central processing unit (CPU) 901 executes various processing according to a program stored in a read-only memory (ROM) 902 or a program loaded to a random access memory (RAM) 903 from a memory section 908. The data needed for the various processing of the CPU 901 may be stored in the RAM 903 as needed. The CPU 901, the ROM 902 and the RAM 903 are linked with each other via a bus 904. An input/output interface 905 is also linked to the bus 904.

The following components are linked to the input/output interface 905: an input section 906 (including keyboard, mouse and the like), an output section 907 (including displays such as a cathode ray tube (CRT), a liquid crystal display (LCD), a loudspeaker and the like), a memory section 908 (including hard disc and the like), and a communication section 909 (including a network interface card such as a LAN card, modem and the like). The communication section 909 performs communication processing via a network such as the Internet. A driver 910 may also be linked to the input/output interface 905. If needed, a removable medium 911, for example, a magnetic disc, an optical disc, a magnetic optical disc, a semiconductor memory and the like, may be installed in the driver 910, so that the computer program read therefrom is installed in the memory section 908 as appropriate.

In the case where the foregoing series of processing is achieved by software, programs forming the software are installed from a network such as the Internet or a memory medium such as the removable medium 911.

It should be appreciated by those skilled in the art that the memory medium is not limited to the removable medium 911 shown in FIG. 9, which has program stored therein and is distributed separately from the apparatus so as to provide the programs to users. The removable medium 911 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 902 and the memory section 908 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for wireless communications, comprising:
processing circuitry configured to:
receive a relay establishment request from a source communication device;
acquire historical energy information and current energy information of candidate communication devices serving as relay candidates, and determine, based on the acquired historical energy information, one or more relay communication devices to be used as relays; and
transmit information on relay establishment to the one or more relay communication devices, the source communication device, and a destination communication device.

2. The apparatus according to claim 1, wherein the processing circuitry is further configured to transmit, in response to the relay establishment request, an energy information collection request to the candidate communication devices, and receive energy information collection responses from the candidate communication devices.

3. The apparatus according to claim 2, wherein the energy information collection responses comprise the historical energy information and the current energy information of respective candidate communication devices.

4. The apparatus according to claim 2, wherein the energy information collection responses comprise the current energy information of respective candidate communication devices, and the processing circuitry is further configured to store the acquired current energy information in association with a time instant at which the current energy information is acquired and an identifier of the candidate communication device corresponding to the acquired current energy information, and acquire the historical energy information of the candidate communication devices from the processing circuitry.

5. The apparatus according to claim 1, wherein the processing circuitry is configured to predicate, based on the historical energy information and the current energy information, energy values of respective candidate communication devices at a next time point using a time sequence predication model, and determine the first N candidate communication devices with maximum energy values as the relay communication devices, wherein $N \geq 1$.

6. The apparatus according to claim 1, wherein the information on relay establishment comprises a D2D identifier.

7. The apparatus according to claim 1, wherein the processing circuitry is further configured to receive a relay request from the source communication device, determine emission power of the source communication device and the relay communication devices, such that total energy consumption is minimum while satisfying a QoS condition, and transmit information on the determined emission power to the source communication device and the relay communication devices respectively.

8. An apparatus for wireless communications, comprising:
processing circuitry configured to:
receive an energy information collection request from a control node;
detect, in response to the energy information collection request, a current energy information value of an electronic device where the apparatus is located; and
transmit the detected current energy information value to the control node, wherein
the processing circuitry is further configured to transmit a relay establishment request or a relay request to the control node.

9. The apparatus according to claim 8, the processing circuitry is further configured to:
store a historical energy information value of the electronic device, and
transmit the historical energy information value to the control node.

10. The apparatus according to claim 8, wherein the processing circuitry is further configured to receive information on relay establishment from the control node.

11. The apparatus according to claim 8, the processing circuitry is further configured to:
acquire historical energy information and current energy information of candidate communication devices serving as relay candidates in the case that the electronic device serves as a source communication device;

determine, based on the acquired information, one or more relay communication devices to be used as the relays; and transmit information on relay establishment to the one or more relay communication devices and a destination communication device.

12. The apparatus according to claim 11, wherein the processing circuitry is further configured to transmit an energy information collection request to the candidate communication devices, and receive energy information collection responses from the candidate communication devices, wherein the energy information collection responses comprise the historical energy information and the current energy information of respective candidate communication devices.

13. The apparatus according to claim 11, wherein the processing circuitry is further configured to predicate, based on the historical energy information and the current energy information, energy values of respective candidate communication devices at a next time point using a time sequence predication model, and determine the first N candidate communication devices with maximum energy values as the relay communication devices, wherein N≥1.

14. The apparatus according to claim 11, wherein the information on relay establishment comprises a D2D identifier.

15. The apparatus according to claim 11, wherein the processing circuitry is further configured to determine emission power of the electronic device and the relay communication devices, such that total energy consumption is minimum while satisfying a QoS condition, and is further configured to transmit information on the determined emission power to the relay communication devices.

16. A method for wireless communications, comprising:
receiving a relay establishment request from a source communication device;
acquiring historical energy information and current energy information of candidate communication devices serving as relay candidates, and determining, based on the acquired historical energy information, one or more relay communication devices to be used as the relays; and
transmitting information on relay establishment to the one or more relay communication devices, the source communication device, and a destination communication device.

17. A method for wireless communications, comprising:
receiving an energy information collection request from a control node;
detecting, in response to the energy information collection request, a current energy information value of an electronic device implementing the method;
transmitting the detected current energy information value to the control node, and
transmitting a relay establishment request or a relay request to the control node.

18. An apparatus for wireless communications, comprising:
processing circuitry configured to:
receive a relay establishment request from a source communication device;
acquire historical energy information and current energy information of candidate communication devices serving as relay candidates, and
determine, based on the acquired historical energy information, one or more relay communication devices to be used as relays; and
transmit information on relay establishment to the one or more relay communication devices, and a destination communication device,
wherein, the apparatus for wireless communications is a source communication device.

19. The apparatus according to claim 18, wherein the processing circuitry is further configured to transmit, in response to the relay establishment request, an energy information collection request to the candidate communication devices, and receive energy information collection responses from the candidate communication devices.

20. The apparatus according to claim 19, wherein energy information collection responses from the processing circuitry comprise the historical energy information and the current energy information of respective candidate communication devices.

21. The apparatus according to claim 19, wherein energy information collection responses from the processing circuitry comprise the current energy information of respective candidate communication devices, and the processing circuitry is further configured to store the acquired current energy information in association with a time instant at which the current energy information is acquired and an identifier of the candidate communication device corresponding to the acquired current energy information, and acquire the historical energy information of the candidate communication devices from the processing circuitry.

22. The apparatus according to claim 18, wherein the processing circuitry is configured to predicate, based on the historical energy information and the current energy information, energy values of respective candidate communication devices at a next time point using a time sequence predication model, and determine the first N candidate communication devices with maximum energy values as the relay communication devices, wherein N≥1.

* * * * *